United States Patent

Steiner et al.

[11] Patent Number: 6,040,907
[45] Date of Patent: Mar. 21, 2000

[54] MICROSCOPE SYSTEM FOR THE DETECTION OF EMISSION DISTRIBUTION AND PROCESS FOR OPERATION OF THE SAME

[75] Inventors: Reinhard Steiner, Stadtroda; Dieter Graefe, Jena, both of Germany

[73] Assignee: Carl Zeiss Jena GmbH, Jena, Germany

[21] Appl. No.: 08/920,680

[22] Filed: Aug. 29, 1997

[30] Foreign Application Priority Data

Jan. 21, 1997 [DE] Germany .......................... 197 01 703

[51] Int. Cl.[7] .................................. G01J 3/18; G01J 3/36
[52] U.S. Cl. ............................................. 356/311; 356/328
[58] Field of Search ................................. 356/237, 317, 356/318, 326, 328, 311

[56] References Cited

U.S. PATENT DOCUMENTS

| | | | |
|---|---|---|---|
| 4,844,617 | 7/1989 | Kelderman et al. | 356/328 |
| 5,112,125 | 5/1992 | Neumann | 356/328 |
| 5,192,980 | 3/1993 | Dixon et al. | 356/326 |
| 5,301,006 | 4/1994 | Bruce | 356/311 |
| 5,706,083 | 1/1998 | Iida et al. | 356/328 |
| 5,767,965 | 6/1998 | Zhou et al. | 356/328 |

*Primary Examiner*—F. L. Evans
*Attorney, Agent, or Firm*—McAulay Nissen Goldberg Kiel & Hand, LLP

[57] ABSTRACT

A microscope system for detecting the emission distribution of specimens which emit light at least in a punctiform manner, particularly for failure analysis of integrated circuits, comprises an imaging beam path from the specimen in the direction of an at least one-dimensional receiver distribution, wherein at least one element is provided in the imaging beam path for spectral division of the light which is emitted at least in a punctiform manner.

6 Claims, 5 Drawing Sheets

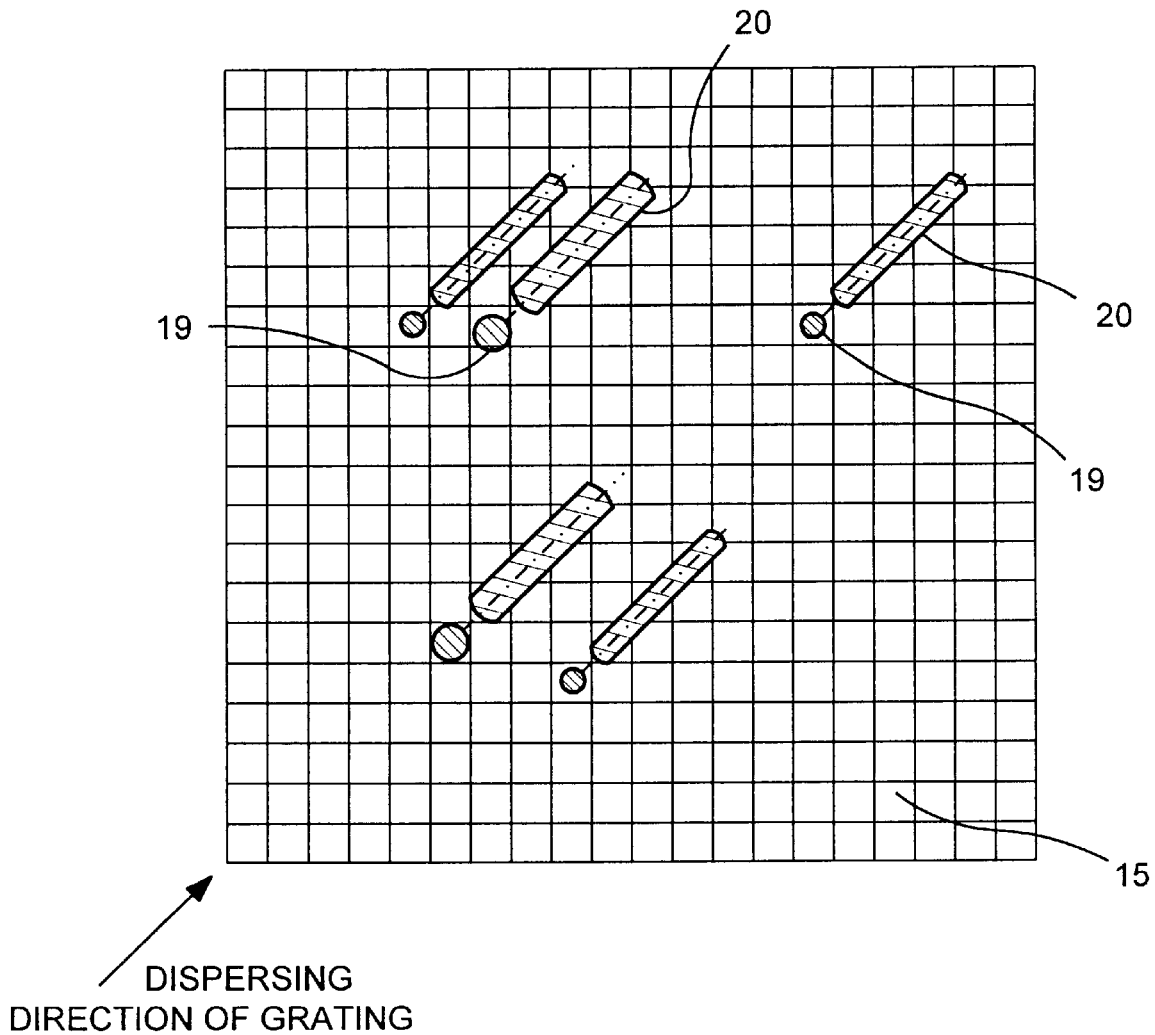
DISPERSING
DIRECTION OF GRATING
F I G. 4

MICROSCOPE SYSTEM FOR THE DETECTION OF EMISSION DISTRIBUTION AND PROCESS FOR OPERATION OF THE SAME

BACKGROUND OF THE INVENTION a) Field of the Invention

Microscope systems in which the photoemission of occurring defects ("hot spots") is subjected to spectral analysis are known for failure analysis of semiconductor circuits. By "hot spots" is meant weak light emissions which occur at defects in electronic circuits when connected to a power supply. Spectral detection of these defects represents a fingerprint for the location in question; that is, conclusions can be reached concerning the source of the defect in the manufacturing process from the spectral configuration.

a) Description of the Related Art

Currently, such hot spots are detected, for example, by devices which are outfitted with exchangeable metal interference filters. ("Photoemission Spectrum Analysis—A Powerful Tool for Increased Root Cause Success", J. S. Seo; S. S. Lee; C. S. Choe; S. Daniel; K. D. Hong; C. K. Yoon; ISTFA 95, 21st International Symposium for Testing and Failure Analysis, Nov. 6–10 1995, Santa Clara, Calif.).

They have the disadvantage that the individual wavelengths of the spectrum to be analyzed are received serially by swiveling in appropriate filters which requires a plurality of filters and time expenditure if a sufficiently closely graded spectrum is needed. In addition, the calibration is problematic.

It was further suggested to pick up the photoemission with an elliptical mirror and to image it on a fiber input ("A High-Sensitivity Photo Emission Microscope System . . . ", Tao; Chim; Chan; Phang; Liu, Centre for Integrated Circuit Failure Analysis, Singapore). This light is fed to a scanning monochromator with SEV via the fiber and is spectrally detected. An X-Y positioning stage brings the focal point of the mirror to the location of photoemission.

Further, arrangements of a microscope in combination with a camera are known for evaluating photoemissions ("Photoemission Spectrum Analysis . . . ", ISTFA, November 6–10, Santa Clara, Calif.). The evaluation is effected in a wavelength-dependent manner with narrow-band exchangeable filters.

Spectral analysis of microscopically small light-emitting objects also has great importance in general for technical and biological analyses. If only partial areas are to be subjected to spectral analysis in the microscopic examination, the insignificant area is generally excluded by a defined selection of pinholes or diaphragms in the beam path and the remainder of the microscopic image is imaged on the entrance slit of a spectrometer following in the beam path, which can be formed, for example, by a dispersive element and a surface receiver. This device construction requires considerable space (auxiliary add-on to the microscope) and is problematic especially as concerns light-absorbing or light-arresting objects due to the limited light-conducting capacity of the spectrometer. Further, this solution brings about considerable costs. Combinations of microscopes and spectrometry arrangements are known, for example, from DE 4419940 A1.

OBJECT AND SUMMARY OF THE INVENTION

It is the primary object of the present invention to avoid the problems mentioned above and to realize a simpler and more economical arrangement and a process for detecting the emission of very small light-emitting objects, preferably in the micrometer range.

In accordance with the invention, a microscope system for detecting the emission distribution of specimens which emit light at least in a punctiform manner, particularly for failure analysis of integrated circuits, comprises an imaging beam path from the specimen in the direction of an at least one-dimensional receiver distribution, wherein at least one element is provided in the imaging beam path for spectral division of the light which is emitted at least in a punctiform manner.

A basic idea of the invention consists in that the radiation or beam emanating from small light-emitting objects reaches a dispersive element directly without intermediate imaging, wherein the dispersive element is a transmission grating, for example.

The grating is advantageously constructed as a blazed grating so that the light to be analyzed is divided up into a spectrum.

The light of the discrete radiating objects which is imaged on the camera chip penetrates a dispersive element which is arranged, for example, in the parallel beam path (filter insert in the microscope) or directly in the camera housing (convergent light). The dispersive element can be a prism (direct-vision prism), a transmission grating or an electrooptically switchable grating. In this way, the light is broken up, by refraction or diffraction, into its spectral constituents which reach different pixels of the surface receiver.

Further, when a grating is used, any existing radiation of the zeroth order corresponding to the spatial position of the object point without dispersive element in the field of view can be used to define the pixel coverage with the individual wavelengths and for the one-to-one correspondence or allocation of the spectra with respect to the source. In this way a very advantageous process sequence can be realized, as will be discussed more fully hereinafter. The pixel size of conventional surface receivers, e.g., 27 $\mu$m, also allows sufficient resolution capability for asymmetrically emitting light points of considerable extent.

In addition to the point size of the radiators, the spectral resolution of the system is determined by the dispersion of the element, the spatial position in the beam path (in the parallel beam path or in front of the camera chip), the focal width of the imaging optics, and the pixel size of the camera.

In a first construction, the dispersive element is oriented in such a way that the spectrum extends along a pixel orientation of the two-dimensional chip.

A diagonal arrangement of the spectrum in a second construction is especially advantageous when a plurality of radiating points are present in a row one after the other in the image field.

The camera used for image reproduction is used, at the same time, for spectral detection in the analyzing process.

Since most microscopes have an insert for filters or other microscope accessories which can be used for insertion of a dispersing element, the solution according to the invention permits simple retrofitting in these devices and accordingly enables a wide range of applicability.

The range of applicability extends in particular to wherever small discrete points in the object image of a microscope or another optical imaging arrangement either radiate themselves or are excited to radiation and whose spectral light distribution is useful. In a surprisingly advantageous manner, as mentioned above, examples are especially the "hot spots" in electronic circuits, but also fluorescence radiation brought about by dark-field excitation or the presence of punctiform light emissions on a dark background in a microscope. For this purpose, it is generally sufficient that the arrangement have a spectral resolution of approximately 10 nm. By selecting the dispersive element, the resolution capability can be adapted to the requirements in a corresponding manner. Moreover, the position of the dispersive element, e.g., in the filter insert of a microscope, makes it possible to exchange the element in a simple manner according to the respective measurement requirements.

The invention is explained more fully hereinafter with reference to the embodiment examples.

BRIEF DESCRIPTION OF THE DRAWINGS

In the drawings:

FIG. 4 shows detection with a diagonal dispersion direction with reference to the chip orientation.

DESCRIPTION OF THE PREFERRED EMBODIMENTS

Figure 1:
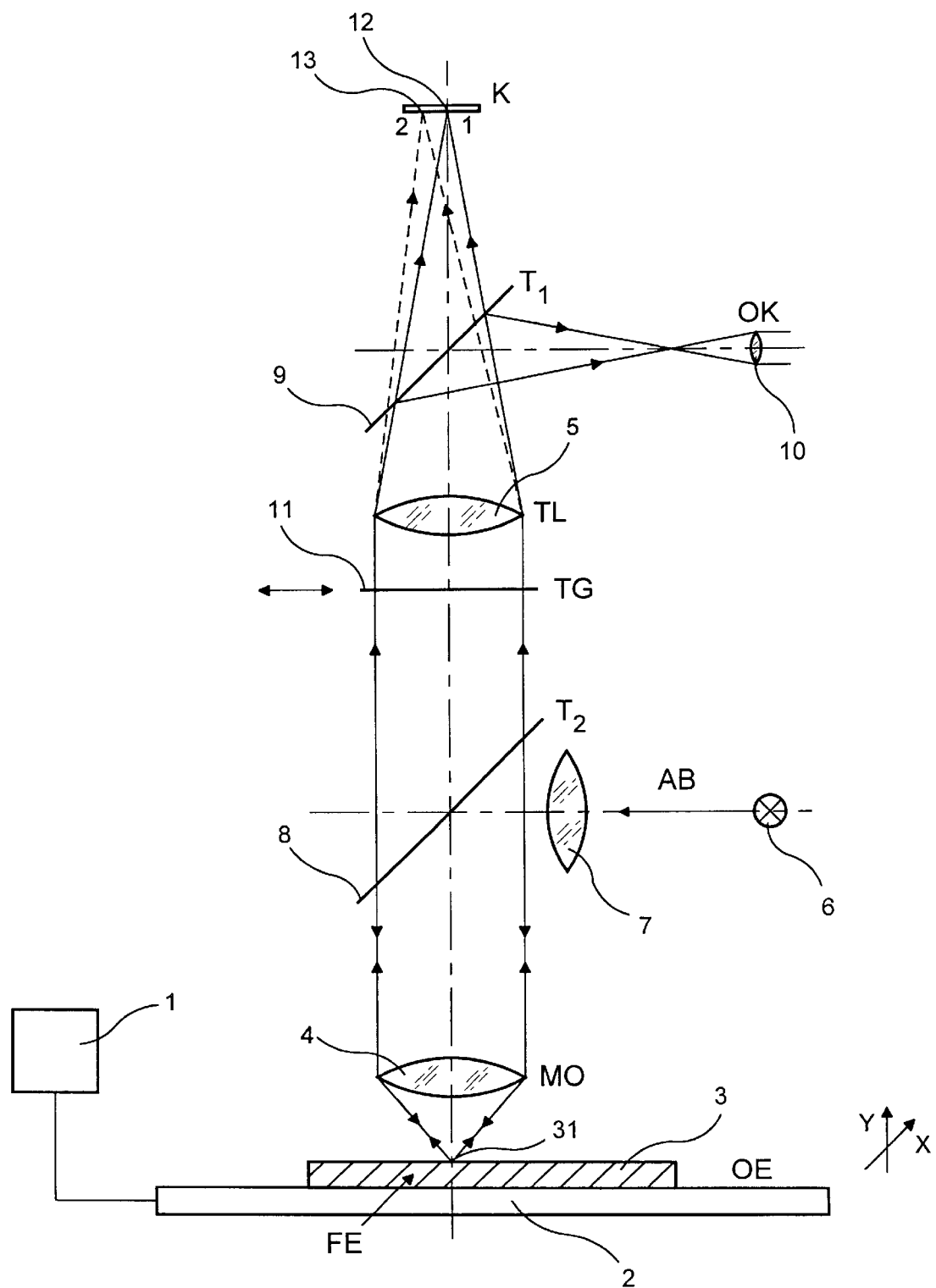
FIG. 1 shows an arrangement according to the invention in a microscope.

In FIG. 1, an object 3, for example, a semiconductor circuit, which has a light-emitting point or region 3.1 is arranged on a microscope stage 2 which is controllable in a known manner by a motor via a computer 1 and is displaceable at least in the X- and Y-directions. In a microscope beam path comprising an objective 4, a tube lens 5, illumination 6 which can be switched off and which is coupled in via illuminating optics 7 and a beam splitter 8, and another beam splitter 9 for imaging in the direction of an eyepiece 10, a transmission grating 11 is arranged between the objective 4 and tube lens 5. The transmission grating 11 represents a spectral division of the light emission of point 3.1 impinging on a CCD receiver 15, e.g., in addition to the image 12 of the point of the zeroth order, as a spectral distribution 13.

Figure 2A:
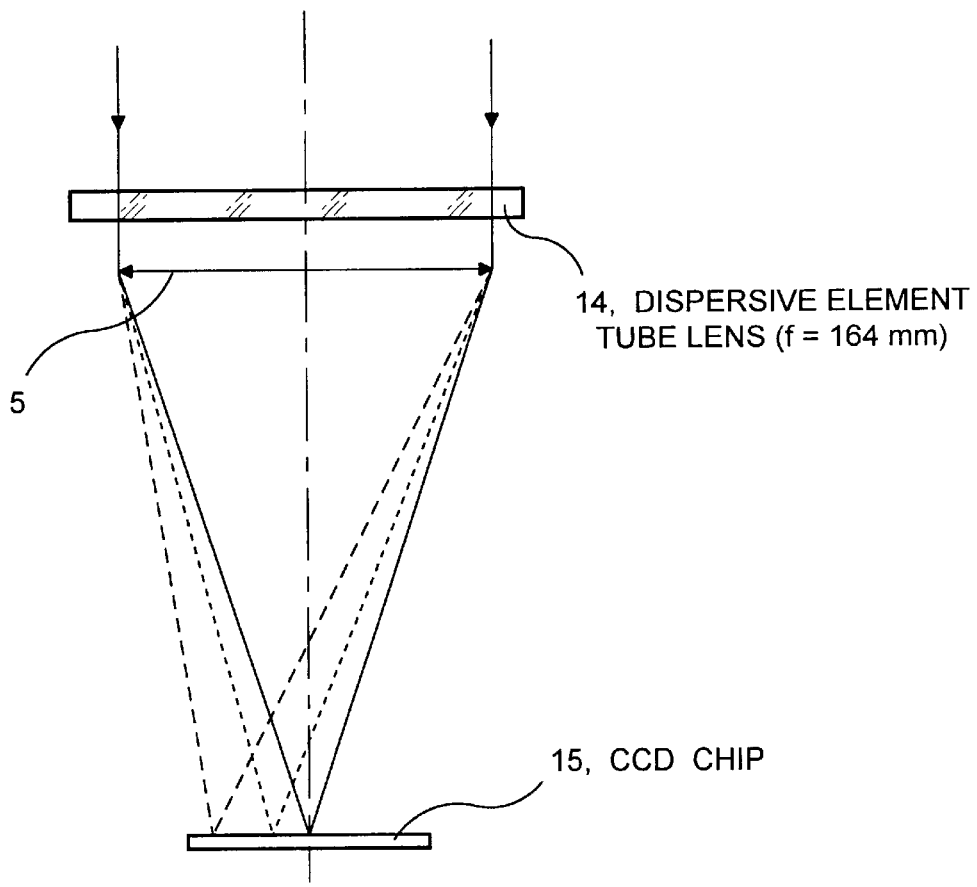
FIGS. 2a and 2b show a transmission grating which is used in the parallel beam path in the direction of a CCD camera in front of a tube lens of a microscope.
Figure 2B:
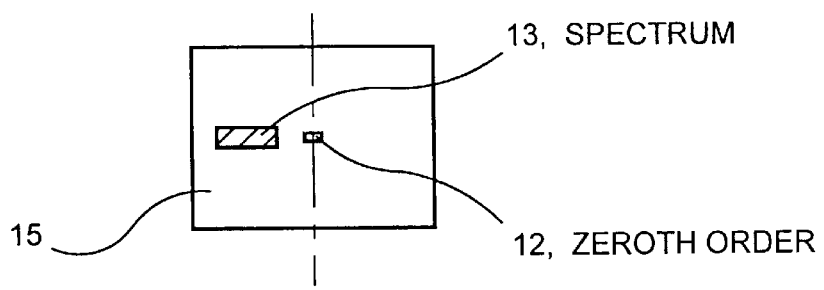

Referring to FIGS. 2a and 2b, FIG. 2a shows a schematic enlarged view of a dispersive element 14 corresponding to the grating 11 in FIG. 1, the tube lens 5, and the CCD receiver 15. FIG. 2b shows the spectral distribution 13 occurring on the dispersive element and the zeroth order 12. The dispersive element is inserted into the parallel beam path (e.g., filter insert) and the zeroth order is accordingly imaged on the camera chip in addition to the spectrum (e.g., first order) by the tube lens. The spectrum passes over the pixels along one or more lines (dispersion direction) and correspondingly determines the signal level on every pixel. The measurement of selected objects can also proceed in the following manner:

- receiving of microscopic image of the chip surface (camera insert)
- switching off of object illumination
- recording of radiant defects by means of the camera
- selection and determination of their spatial coordinates by marking (clicking on) the defects in the camera image (software)
- swiveling the transmission grating into the beam path
- automatically moving the first defect into a predetermined coordinate in the image field (e.g., center) which serves as entrance slit. The spatial coordinate of the zeroth order and the wavelength coverage of all spectrometer pixels are accordingly determined (wavelength calibration)
- receiving of the spectrum of the first defect approached. A plurality of pixels of the camera chip are connected together vertically to the dispersing direction so that the total light quantity is detected.
- Input of additional coordinates of the defects and recording of their spectra.

Figure 3:
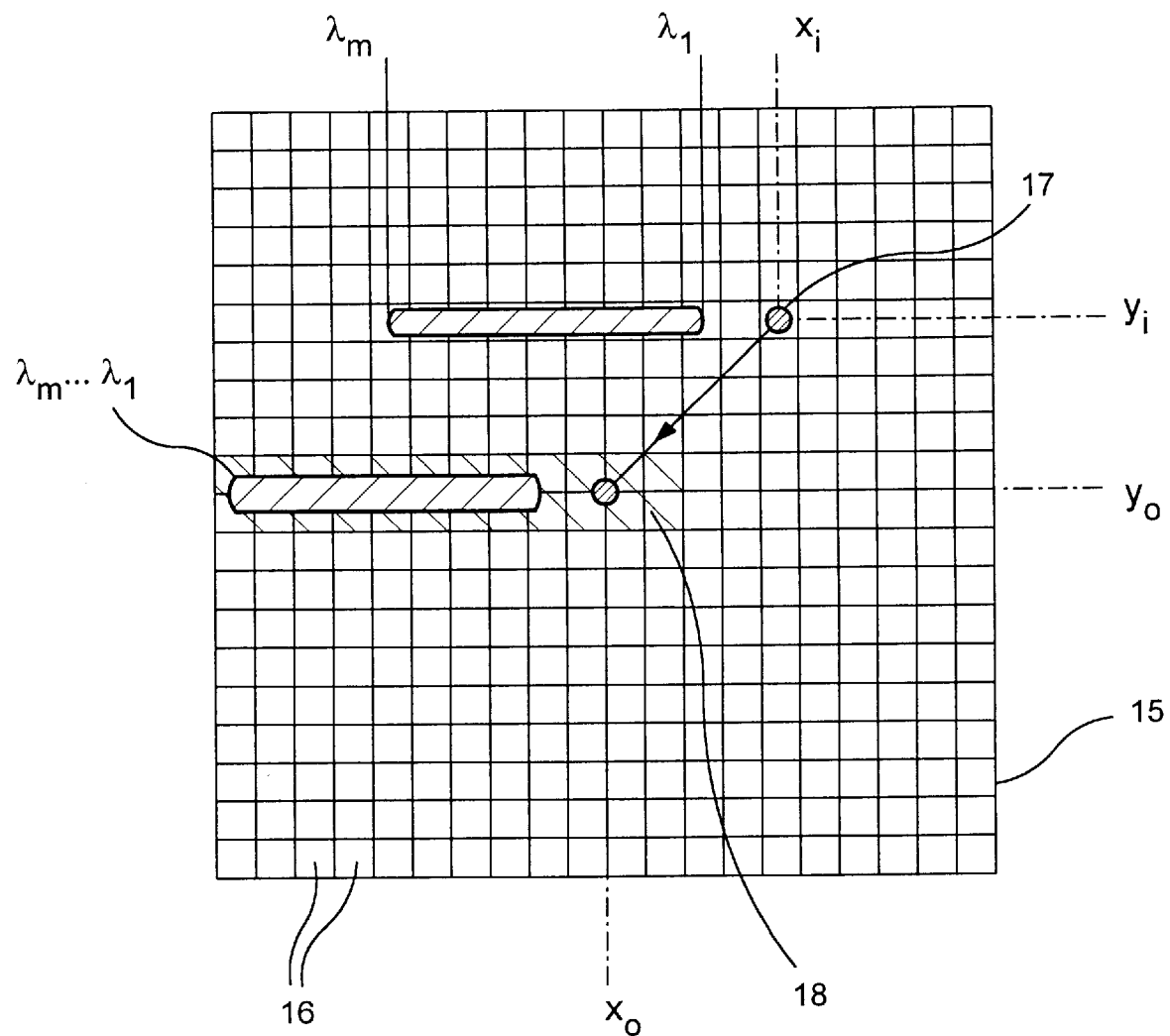
FIG. 3 shows the simultaneous detection of a plurality of radiant object points.

In FIG. 3, a detected light point 17 with coordinates xi, yi is shown on the CCD chip (or display) 15 with the individual pixels 16, for example. When the dispersive element is switched on, there results a spectral distribution $\lambda 1-\lambda m$ which can be read out by corresponding switching to the pixels lying in row yi.

However, as a result of controlling the microscope stage, the light point can also be moved in preferably central coordinates xo, yo on the CCD chip, wherein a pixel surface 18 lying parallel to direction yo receives the spectrum $\lambda 1-\lambda m$ as a kind of line receiver. In order to analyze a plurality of light points, the latter are moved one after the other into a defined coordinate xo, yo in an analogous manner and read out by the line receiver.

Since a surface detector is generally available as a result of the camera connected to the microscope, it is also possible to simultaneously detect a plurality of radiant object points when equipped with corresponding software.

In the case of the analysis of so-called "hot spots", as a result of the x-y addressing in the lithographic production method (and accordingly also the defect position) of the electronics chip, a dispersion direction diagonal to these preferred orientations is provided. Accordingly, the spectra of different closely adjacent light points can be superimposed, resulting in erroneous measurements.

The coordinates of the points in the surface detector can be determined by means of software and, after swiveling in the dispersive element, its associated spectral distributions occurring as a result of the dispersion direction can all be received simultaneously corresponding to the adjacent pixel energies. Accordingly, no movement of the object is required for receiving all light points.

FIG. 4 shows an arrangement of this kind, wherein the dispersing direction does not lie parallel to the orientation of the receiver elements of the CCD chip. A plurality of light points 19 is shown, each with its resulting spectrum 20, wherein the receiver elements lying in the dispersion direction are used for evaluating.

Figure 5:
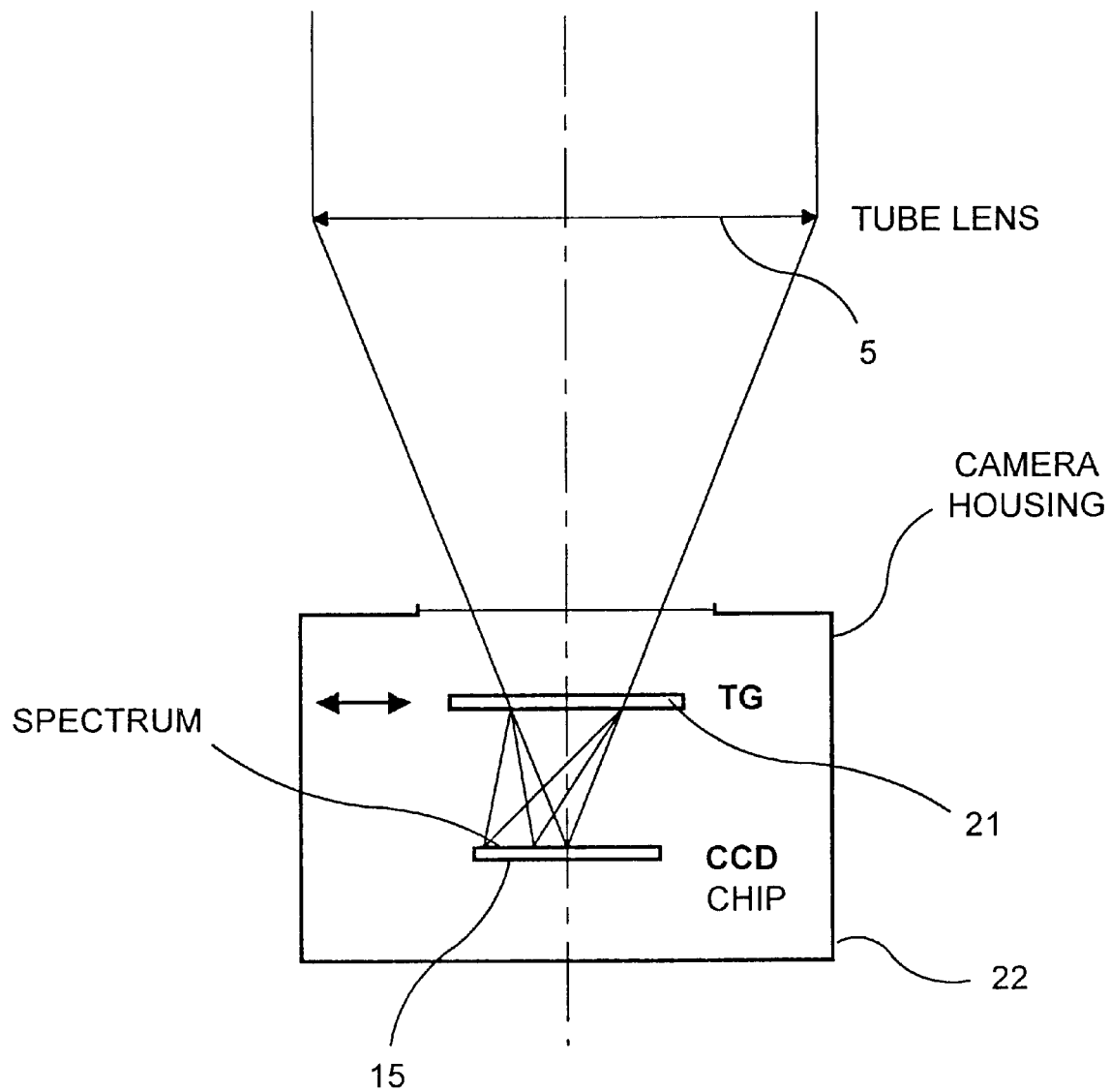
FIG. 5 shows the arrangement of a transmission grating in the housing of the camera.

Further, the small opening of the bundle imaged through a tube lens on the camera chip also advantageously makes it possible to introduce a transmission grating on a thin substrate for spectral detection into the convergent bundle after the tube lens. The zeroth order serves in turn to determine the spectral coverage of the camera pixels and can also be used for normalizing intensity. The simultaneous detection of a plurality of light points by adjusting a corresponding dispersion direction is possible. In FIG. 5, a dispersive element, in this case a transmission grating 21, is arranged between the tube lens 5 and the CCD chip 15 in the convergent beam path and forms a component part of a camera housing 22 which is mounted on the photo-output of a microscope, not shown.

Other dispersive elements aside from the diffraction gratings mentioned above can also be used in an advantageous manner. The use of a prism (direct-vision prism) in the parallel beam path instead of a diffraction grating has the advantage that all of the occurring light energy is divided up into a spectrum, which is advantageous in the case of light-absorbing radiators.

As a result of the immersion of a blazed grating with a material with a variable refractive index, e.g., with liquid crystals, it is possible to realize the state of the flying-spot detection or spectral analysis without a mechanical adjusting process in that the beam-influencing function of the diffracting structure is first completely canceled due to the refractive index of the immersion, and the liquid crystal is switched for the spectral analysis process, and the phase grating diffracts the penetrating light corresponding to the spectral composition. Such gratings are described, for example, in Ferstl, Frisch: "Static and Dynamic Fresnel Zone Lenses for Optical Interconnections", Special Issue of the Journal of Modern Optics on Diffractive Optics, July 1996.

The invention is not restricted to the embodiment examples shown herein. In particular, there are other conceivable concretely modified arrangements with dispersive elements in the imaging beam path of a microscope which generate spectral distributions of emitting light points on the CCD matrix.

What is claimed is:

1. A process for the operation of a microscope system having an imaging beam path from a specimen in a direction of an at least one-dimensional receiver distribution, comprising the steps of:

imaging the specimen to produce a light output from said specimen;

displaying an image representative of said light output by the specimen;

marking one or more points or areas of the displayed image;

providing, after marking of said one or more points or areas, within the imaging beam path an element adapted to spectral divide fight emitted at least in a punctiform manner;

moving the one or more marked points or areas into a predetermined image coordinate of the displayed image; and receiving a spectrum of light resulting from the spectral division of light by said element.

2. The process for the operation of a microscope system according to claim 1, wherein the step of marking is carried out by a step of detecting emitting points or areas automatically or by marking said points or areas displayed; and the method further comprises the step of:

displaying light-sensitive areas of the receiver distribution which are arranged in the dispersing direction as viewed from the marked or detected starting point.

3. The process according to claim 2, wherein the detecting step is carried out in a dispersing direction.

4. The process according to claim 2, wherein the detecting step is carried out at an angle to the direction of rows or columns of the receiver distribution.

5. The process for the operation of a microscope system according to claim 2, further comprising the step of simultaneously detecting and evaluating a plurality of emitting points or areas and their spectral distribution by controlling light-sensitive areas of the receiver distribution.

6. The process for the operation of a microscope system according to claim 2, further comprising the steps of:

storing the spectral distributions in storage elements;

detecting the frequency/intensity of occurrence of individual wavelengths of said spectral division stored in the storage elements; and one-to-one assigning of the spectral distributions corresponding to their detected frequency distribution.

* * * * *